(12) United States Patent
Pauer et al.

(10) Patent No.: US 10,551,168 B2
(45) Date of Patent: Feb. 4, 2020

(54) DEFORMATION DEVICE, INCLUDING AN OPTICAL WAVEGUIDE AND METHOD FOR MEASURING DEFORMATION OF A TUBULAR STRUCTURE AT MULTIPLE MEASURING POINTS

(71) Applicant: Karlsruher Institut für Technologie, Karlsruhe (DE)

(72) Inventors: Hendrikje Pauer, Leonberg (DE); Christoph Ledermann, Karlsruhe (DE)

(73) Assignee: KARLSRUHER INSTITUT FUR TECHNOLOGIE, Karlsruhe (DE)

( * ) Notice: Subject to any disclaimer, the term of this patent is extended or adjusted under 35 U.S.C. 154(b) by 56 days.

(21) Appl. No.: 15/736,923

(22) PCT Filed: Jun. 15, 2016

(86) PCT No.: PCT/EP2016/063754
§ 371 (c)(1),
(2) Date: Dec. 15, 2017

(87) PCT Pub. No.: WO2016/202857
PCT Pub. Date: Dec. 22, 2016

(65) Prior Publication Data
US 2018/0364030 A1    Dec. 20, 2018

(30) Foreign Application Priority Data

Jun. 16, 2015  (DE) .................. 10 2015 211 037

(51) Int. Cl.
*G01B 11/16* (2006.01)
*G01D 5/353* (2006.01)

(52) U.S. Cl.
CPC ............ *G01B 11/165* (2013.01); *G01B 11/18* (2013.01); *G01D 5/35383* (2013.01)

(58) Field of Classification Search
CPC ....... G01B 11/165; G01B 11/18; G01B 11/16; G01D 5/35383; G01L 1/242; B32B 1/08
See application file for complete search history.

(56) References Cited

U.S. PATENT DOCUMENTS 6,211,964 B1    4/2001    Luscombe et al.
7,772,541 B2    8/2010    Froggatt et al.
(Continued)

FOREIGN PATENT DOCUMENTS

WO        2014101754 A1    7/2014

OTHER PUBLICATIONS

International Search Report in International Application No. PCT/EP2016/063754, dated Aug. 17, 2016.
(Continued)

*Primary Examiner* — Harshad R Patel
*Assistant Examiner* — Nigel H Plumb
(74) *Attorney, Agent, or Firm* — J.A. Lindeman & Co. PLLC; Jeffrey Lindeman; Joseph Parisi (57) ABSTRACT

The invention includes an apparatus (110) and method (152) for determining a deformation (170) of a three-dimensional, flexible structure in the form of a tubular construct (112) with a minimum of optical waveguides. An optical waveguide (116) is introduced into the tubular construct (112), where the optical waveguide (116) extends as a helical winding (118) within the tubular construct (116) and has a multiplicity of strain measuring means (126). The configuration of the apparatus and method performed reduces the average material load of the strain measuring means and improves resolution and measurement range of the sensor (optical waveguide) while maintaining readout frequency of the strain measurements. The apparatus (110) also includes an evaluation device (130) configured to determine the deformation of the tubular construct (112), in particular in
(Continued)

relation to an axis, surface and/or volume of the tubular construct (112), from measurement values (154) from the multiplicity of strain measuring means (126).

12 Claims, 2 Drawing Sheets

(56) References Cited

U.S. PATENT DOCUMENTS

| | | |
|---|---|---|
| 7,781,724 B2 | 8/2010 | Childers et al. |
| 7,792,405 B2 | 9/2010 | Stoesz et al. |
| 2004/0096614 A1 | 5/2004 | Quigley et al. |
| 2007/0012872 A1 | 1/2007 | Poland et al. |
| 2007/0201793 A1 | 8/2007 | Askins et al. |
| 2011/0109898 A1 | 5/2011 | Froggatt et al. |
| 2012/0314988 A1 | 12/2012 | Childers et al. |
| 2013/0094798 A1 | 4/2013 | Duncan et al. |
| 2013/0286378 A1 | 10/2013 | Dutoit |

OTHER PUBLICATIONS

Translation of International Preliminary Report on Patentability in International Application No. PCT/EP2016/063754, dated Dec. 28, 2017.

Pauer et al., "Motivation of a new Approach for Shape Reconstruction Based on FBG-Optical Fibers", Proceedings of IEEE Ninth International Conference on Intelligent Sensors, Sensor Networks and Information Processing (ISSNIP), 2014.

DEFORMATION DEVICE, INCLUDING AN OPTICAL WAVEGUIDE AND METHOD FOR MEASURING DEFORMATION OF A TUBULAR STRUCTURE AT MULTIPLE MEASURING POINTS

FIELD OF THE INVENTION

The invention relates to an apparatus and a method for determining a deformation of a three-dimensional, flexible structure in form of a tubular construct. Here, the three-dimensional, flexible structure can be present in form of a solid tube or it can assume the form of a hollow, tubular construct which can be pulled over an object in such a way that the object abuts on the inner side of the hollow, tubular construct at least in part, in order thus to be able to determine the deformation of the introduced object.

PRIOR ART

The prior art has disclosed apparatuses and methods for determining a deformation of three-dimensional, flexible structures in form of tubular constructs. Hereby, it is possible to capture a form of the tubular construct which is equipped with strain measuring means. Such apparatuses find use, in particular, in the field of robotics and minimally invasive surgery, where they serve as a sensor and for tracking flexible instruments such as endoscopes.

U.S. Pat. No. 7,781,724 B2 describes an apparatus and a method for determining the deformation of a three-dimensional, flexible construct which has fibers that are guided in parallel but separately from one another, said fibers in each case being equipped with fiber Bragg gratings (FBG) that are arranged in succession as strain measuring means. For the purposes of determining the deformation, it is necessary for a plurality of strain measuring means to respectively lie in a cross-sectional plane perpendicular to a central axis. Using the strain measuring means, the curvature of the construct in relation to the central axis is ascertained thus and the associated deformation is determined therefrom. A disadvantage of this lies in the parallel guidance of the fibers which, firstly, causes a high average material load on the fibers and, secondly, may significantly restrict resolution and measurement range of the sensor on account of a small distance of the fibers from the central axis of the structure.

In U.S. Pat. No. 7,772,541 B2, the fibers are not equipped with fiber Bragg gratings (FBG) as strain measuring means but instead have gratings that are introduced continuously over the entire course, or use natural Rayleigh scattering, for measuring the strain. Although, as a rule, a higher resolution can be obtained—with a greater instrument-based outlay—when determining the deformation on account of a high density of strain measuring means, this is to the detriment of the readout frequency.

US 2011/0109898 A1 discloses an apparatus and a method for determining the to deformation of a three-dimensional, flexible construct which has a multi-core fiber that can be arranged helically about the central axis of the structure. Here too, the curvature is ascertained in relation to the central axis, in each case by means of a strain measuring means lying in each core, said strain measuring means being arranged in a cross-sectional plane perpendicular to the central axis, and the deformation of the construct in the region of the plane is determined therefrom.

U.S. Pat. No. 7,792,405 B2 describes a method for producing an arrangement made of optical fibers within a hollow cable. To this end, a curvature initially is produced in the hollow cable before the optical fibers are introduced into the interior of the hollow cable and fastened there in such a way that they assume a course that is as short as possible in the interior of the hollow cable.

Further methods and apparatuses for determining a deformation of three-dimensional structures are known from US 2013/0286378 A1, US 2013/0094798 A, US 2012/0314988 A1 and US 2007/0201793 A1. US 2007/0012872 A1 describes a method and an apparatus for determining the position optically, while U.S. Pat. No. 6,211,964 B1 discloses a fiber optical acoustic sensor. WO 2014/101754A1 describes a sensor for determining a physical variable, having a multi-core optical fiber.

As a consequence, the known apparatuses and methods for determining the deformation of three-dimensional, flexible structures in form of tubular constructs require an ascertainment of measurement values at at least two strain measuring means for determining a plane deformation in three-dimensional space or an ascertainment of measurement values at at least three strain measuring means for determining any deformation in three-dimensional space, which may also include a torsion of the construct, with it being necessary for the two or the three strain measuring means to be arranged in a cross-sectional plane of the construct perpendicular to the central axis of the construct. In order to be able to obtain sufficient accuracy in the determination of the deformation, a placement that is as accurate as possible of the strain measuring means in the cross-sectional plane is necessary in each case to this end. To this end, it is necessary to position the strain measuring means as exactly as possible within the fibers of the construct during the production, wherein, however, the position of the strain measuring means may change uncontrollably over time as a result of material drift. Here, significant measurement inaccuracies may occur due to determining the deformation from the curvature of the cross-sectional plane in relation to the central axis. Moreover, many sections in the construct, which lie between the strain measuring means, are not accessible for an observation. If significant changes in the form of the construct occur in the sections, errors in the determination of the deformation of the construct may arise as a result thereof.

Therefore, H. Pauer, C. Ledermann and H. Woern, *Motivation of a new Approach for Shape Reconstruction Based on FBG-Optical Fibers*, Proceedings of IEEE Ninth International Conference on Intelligent Sensors, Sensor Networks and Information Processing (ISSNIP), 2014, presents a network of strain measuring means made of FBG sensors, which are randomly distributed over the three-dimensional structure. In order to determine the strain, it is proposed to initially set up a discrete tensor field which can receive values for the strain of the construct in relation to the central axis at the position of the strain measuring means. In order to obtain a continuous tensor field, there should be, following this, an interpolation of measurement information between the positions of the strain measuring means. Finally, the problem that the continuous tensor field for the strain of the construct obtained thus must be transformed into a continuous tensor field for the deformation of the construct is discussed.

OBJECT OF THE INVENTION

Proceeding therefrom, the object of the present invention consists in providing an apparatus and a method for determining a deformation of a three-dimensional, flexible structure in form of a tubular construct, which at least partly overcome the disadvantages and limitations of the prior art discussed above. In particular, the apparatus should be able to determine the deformation of the three-dimensional, flexible construct by means of strain measuring means, which are arranged in as few optical waveguides as possible, in the simplest possible way and with great accuracy by means of the method.

DISCLOSURE OF THE INVENTION

This object is achieved by an apparatus and a method for determining a deformation of a three-dimensional, flexible structure in form of a tubular construct, having the features of the independent patent claims. Advantageous developments, which are realizable individually or in any combination, are presented in the dependent claims.

Hereinafter the terms "have", "comprise" or "include" or any grammatical deviations therefrom are used in a non-exclusive way. Accordingly, these terms can refer either to situations in which, besides the features introduced by these terms, no further features are present, or to situations in which one or more further features are present. By way of example, the expression "A has B", "A comprises B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by the person skilled in the art, can also be carried out using other configurations. Similarly, features introduced by "in an embodiment of the invention" or by "in an exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect, the present invention relates to an apparatus for determining a deformation of a three-dimensional, flexible structure in form of a tubular construct, in particular in relation to an axis, preferably the central axis, a surface and/or a volume of the construct. Here, the "central axis of the construct" is understood to mean an imaginary line which extends in such a way through the preferably cylinder-like construct that points on the central axis of the construct in each case have the greatest possible distance from the points on the outer surface of the construct. However, relating the deformation to a different axis than the central axis of the tubular construct is conceivable. Here, the "surface" is understood to mean at least part of that face which delimits the construct to the outside. The "volume" is understood to mean at least part of the space which is assumed by the construct.

Here, the apparatus comprises at least the tubular construct and at least one evaluation device, which are described in detail below. Here, the term "tubular construct" is understood to mean a three-dimensional body with an outer surface, which is embodied in form of a tube and has a length and a cross section which is arranged perpendicular to a central axis of the body and which may be constant or vary over the length of the body. In relation to the surface, the cross section may have any form, i.e. a round form, an oval form, a polygonal form or any other form, wherein round forms or oval forms that only deviate slightly from the round form are preferred. Depending on the usage purpose, other types of forms—in contrast to the described cylinder-like form of the construct—may also be preferred.

The construct is flexible which—in particular in contrast to a rigid construct, which keeps its form under a usual type of external application of force—should be understood to mean a body whose form is reversibly adaptable to the type and size of the external application of force. As a consequence, the flexible construct is, in particular, flexible, can follow torsions and, up to a certain degree, may be yielding in relation to an external pressure that is directed to, in particular perpendicular to, a surface of the construct. Consequently, the term "deformation" denotes a change in the three-dimensional form of the construct caused as a consequence of an external application of force directed onto the construct, which change in the three-dimensional form of the construct may result in a bending of the construct and/or in a torsion (twist) of the construct and/or in a spatial change at at least one point on the surface of the construct (impression or bulge). This type of configuration of the flexible construct forms the basis for the function of the construct, described below, as a sensor for the deformation of the three-dimensional structure.

The flexible, tubular construct preferably has a flexible carrier body, which has a carrier material which preferably comprises at least one plastic, in particular polyethylene (PE), a poly(organo)silicate, an inorganic-organic hybrid polymer, or at least one glass fiber. Depending on the selected purpose of use, further carrier materials are conceivable.

Introduced into the flexible carrier body there is at least one optical waveguide, preferably a fiber, in particular a glass fiber, which extends in form of a helical winding within the flexible carrier body in the tubular construct. Here, the "helical winding" is understood to mean a spatial course of the optical waveguide in the flexible carrier body which extends in form of a screw-shaped winding along the central axis of the construct. High loads on the optical waveguides can be largely avoided by the use of the helical winding, which high loads occur in the case of a conventional longitudinal guidance of the optical waveguides in the carrier body and which may even go as far as breaking the optical waveguides. Along their course, the optical waveguides may have a constant pitch for the winding. In the case of a low pitch of the winding, it is possible to obtain a lower load on the optical waveguide but this may result in a lower significance of measurement values. In the case of a lower pitch of the winding, it is possible thus to introduce more measurement points over a certain length of the tubular construct, which may firstly increase the accuracy but secondly may lead to higher costs as a result of a greater number of strain measuring means. Therefore, the pitch of the winding of the optical waveguides may alternatively vary all over or only in selected sections of the construct. Likewise, a set variation over the course of the optical waveguides in the construct is conceivable, for example by virtue of a lower winding being selected at important spots, such as a controllable head of an endoscope, than over the further course of the tubular construct.

Preferably, the tubular construct has only a single optical waveguide, in particular in order thus to provide a sensor that is as simple and cost-effective as possible. However, in a special configuration, at least two optical waveguides may be introduced into the carrier body, for example as described below, which at least two optical waveguides may have a parallel course in relation to one another. However, a non-parallel guidance of the at least two optical waveguides in relation to one another may also be advantageous, in particular since such an arrangement may reduce a load on the optical waveguides in the case of the deformation of the construct. However, in a special configuration, in each case two of the optical waveguides may have, in pairs, an opposing helical winding. Moreover, the optical waveguide can be introduced into the construct in only one direction or they can have an outward guidance and return guidance within the carrier body, wherein the return guidance may have, in particular, a helical winding that opposes that of the outward guidance.

In order to satisfy the above-described function as a sensor for the deformation of the three-dimensional structure, the at least one optical waveguide has a multiplicity of strain measuring means. Here, the term "strain measuring means" is understood to mean a device which is configured to ascertain a strain at a point within the construct. Here, the term "strain" denotes a relative change in length at a location at which the associated strain measuring means is situated. In principle, all types of strain measuring means, in particular electrical or fiber optical strain measuring means, which are known from the prior art are suitable to this end. However, use is preferably made of the fiber Bragg gratings (FBG) mentioned at the outset, which are respectively understood to be an optical interference filter which has been introduced into the appropriately embodied optical waveguide, in particular the glass fiber. The interference filter is configured in such a way that it is able to reflect optical waves with wavelengths that lie within a filter bandwidth of the interference filter. Since the reflected wavelength also changes on the basis of the changing geometry of the optical waveguide in the case of a change in the temperature and/or in the case of an occurrence of strain in the construct, this renders it possible to detect changes in the temperature and/or the occurrence of strain in the optical waveguide. Therefore, in order only to determine the strain, it is advantageous to set a temperature during a measurement that is as constant as possible or to undertake a compensation of possible temperature changes by means of a temperature-compensated FBG. Optical waveguides, which have light channels and FBGs introduced into the cladding of the optical waveguide, are likewise suitable. Alternatively, or additionally, other suitable options, such as e.g. an application of Rayleigh scattering, may likewise be used as a strain measuring means. Multiplexing can be used for determining measurement values in the case of a presence of a multiplicity of strain measuring means in a single optical waveguide.

The multiplicity of strain measuring means can be distributed over one or more optical waveguides in a freely selectable manner. However, it may be advantageous to attach the strain measuring means at specially selected points within the optical waveguide, for example at spots at which particularly strong bending of the construct into which the optical waveguide has been inserted are to be expected. As a consequence and in contrast to the apparatuses known from the prior art, there are no fundamental prescriptions according to the present invention for a required placement of the strain measuring means along the course of the optical waveguide.

As mentioned above, the present apparatus furthermore comprises at least one evaluation device which is configured to determine the deformation of the tubular construct, in particular in relation to an axis, a surface and/or a volume of the construct, from measurement values from the multiplicity of strain measuring means. The term "evaluation device" is understood to mean, in this case, a device which, while separate from the tubular construct, is connected to the latter by way of one or more connections, in particular wired or wireless interfaces, wherein the connections permit the transmission of measurement values from the multiplicity of strain measuring means to the evaluation device. The evaluation device may have one or more integrated circuits, in particular one or more application-specific integrated circuits (ASICs), one or more data processing installations, preferably one or more computers, microcomputers or microcontrollers. The use of additional electronic components, in particular preamplifiers, A/D converters and/or filters, is conceivable. Moreover, the evaluation device may have one or more further sensors or may be connected to one or more further sensors which, in particular, may be equipped for determining the temperature.

Furthermore, the evaluation device may be configured to be able to carry out at least one computer program, in particular a computer program which carries out or assists one or more steps of the method, described here, for determining the deformation of the construct. Preferably, one or more algorithms can be implemented to this end, which algorithms can determine the deformation of the tubular construct using measurement values from the multiplicity of strain measuring means.

In a particularly preferred configuration, the evaluation device can be configured to relate deformation information ascertained from the measurement values of the deformation of the tubular construct to an axis, a surface and/or a volume of the tubular construct. Here, the terms "reference" or "relating" are understood to mean a construction of a relation between values of the deformation information determined for the surface or for the volume of the tubular construct with locations along an axis, a surface or a volume in the tubular construct, wherein the relation can provide values for the deformation of the tubular construct in relation to the selected axis or surface or to the selected volume.

In this particularly preferred configuration, the evaluation device preferably can be suitable for ascertaining the deformation information, according to the definition, from values in relation to the deformation of the tubular construct, which are available locally as deformation gradients. Here, the term "deformation gradient" is understood to mean a spatial derivative of the deformation in relation to any direction. As a result of this, the evaluation device can ascertain deformation information for the surface (jacket form) or the volume of the construct. As presented in detail below, the form profile according to an axis can be parameterized to this end, taking into account the known geometry of the tubular construct, in particular parameterized in relation to an axis, a surface or a volume of the construct.

In a further, likewise preferred configuration, the evaluation device further can be configured to undertake an assignment of the measurement values to points on a surface or a volume of the tubular construct. To this end, the evaluation device can assign the measurement values, which were captured at a multiplicity of strain measuring means in the at least one optical waveguide of the construct, to points on a surface or a volume, wherein each point is set by the respective location at which its associated strain measuring means is situated. In contrast to the apparatuses known from the prior art, the evaluation device can relate the captured measurement values for the strain directly to the aforementioned points. The measurement values for the strain, which respectively denote a relative change in length at the location at which the associated strain measuring means is situated, can therefore also be interpreted as first directional derivative of the form of the construct. The discrete measurement information provided here by the evaluation device consequently corresponds to a local deformation of the form of the construct at the aforementioned points.

In a first, preferred configuration, the flexible structure of the three-dimensional body may be present in form of a solid tube which, in particular in the entirety thereof, may consist of the carrier body and the at least one optical waveguide introduced therein.

In a further, likewise preferred configuration, the flexible structure of the three-dimensional body may assume the form of a hollow, tubular construct. This configuration is understood to mean a form of the construct which, preferably over the entire length of the construct, is configured in relation to the central axis of the construct in such a way that at least one cavity is situated in the carrier body, which cavity can be filled, wholly or partly, with a fluid or, as explained in more detail below, with an object. Depending on the desired configuration, the tubular construct may have one or more cavities in this case, which cavities can be arranged separately from one another and/or connected to one another by means of channels. As a result of this, the hollow, tubular construct may additionally have, in addition to an outer side on the outer surface of the construct pointing away from the central axis of the construct, an inner side on the surface of the construct that faces the central axis of the construct and that is formed by the cavity in the interior of the construct. In this configuration, it may be advantageous to guide the at least one optical waveguide, which has been introduced into the carrier body of the construct, with as little distance as possible from the outer side of the construct. Moreover, in this configuration, the evaluation device may be configured to determine both the deformation on the outer side of the tubular construct and the deformation on the inner side of the hollow, tubular construct, in particular in relation to the central axis which, in this configuration, may extend partly or completely in the cavity. In this case, too, the orientation of the central axis of the construct is determined only from the outer surface of the construct; the inner side remains unconsidered in this case.

In a special configuration, the hollow, tubular construct can be configured to be pulled, in particular to be put, over an object, either completely or partially, which object can be introduced into the cavity of the tubular construct. Here, the object can be any body which has a surface with external dimensions that facilitate an introduction into the cavity of the construct with the hollow, tubular structure. Here, the object preferably can be embodied in form of an elongate body, preferably as a tubular object, and can have a length and a cross section which can be constant or vary over the length of the body. The cross section of the object can have any form, i.e. a round form, an oval form, a polygonal form or any other form, wherein a round form or an oval form that only deviates slightly from the round form is preferred. Depending on the selected usage purpose, it is also possible—in addition to the particularly preferred form of a round tube—for other forms to be preferred. Here, the object can also be a measuring instrument, an actuator or a part thereof, which can be inserted into the cavity of the present apparatus or around which the apparatus can be put.

In the present configuration, the object can abut, at least in part, on the inner side of the hollow, tubular construct. In this case, it can be particularly advantageous if the object likewise is present in form of a flexible body and, in this case, the evaluation device furthermore is equipped to determine from the measurement values from the multiplicity of strain measuring means the deformation of the flexible object that has been introduced into the hollow, tubular construct. Expressed differently: the hollow, tubular construct which has the at least one optical waveguide for determining the deformation thus is able, simultaneously, to ascertain the deformation of the object abutting on the inner side of the construct by way of determining the deformation on the inner side of the construct. In particular, this option nevertheless can be used to be able to determine, at least in part, the deformation of the object by putting said construct over at least part of the object which does not or cannot have any optical waveguide with strain measuring means introduced therein. Moreover, the evaluation device additionally can use the deformation information in relation to the interior object, for example in the form of signals which can be output to control motors, which the object may have.

In a special configuration, the tubular construct can have at least two mutually separated layers, independently of whether said construct is embodied in form of a solid or hollow body. The layers which, in particular, each may extend, completely or in part, in form of a cylindrical ring along the central axis of the construct preferably can have the same carrier material or else have different carrier materials. Here, in relation to its central axis, the tubular construct can have at least one outer layer which adjoins the outer side of the construct. Here, the outer layer additionally may be provided, wholly or in part, with one or more protective layers. In the case where the tubular construct is present in form of a hollow body, an inner layer, which adjoins the inner side of the hollow, tubular construct, may moreover be present. In each of the at least two layers at least one of the optical waveguides may extend. However, other types of the configuration for the at least two layers are conceivable.

In a particularly preferred configuration, the outer layer, in this case, may be borne in a manner displaceable in relation to the inner layer. In this configuration, the inner layer can be decoupled from the outer layer, for example by the application of a film of lubricant introduced between the two layers, in such a way that a transfer of torsion from the outer layer to the inner layer can be avoided, as a result of which a torsion-free measurement of the form becomes possible.

In a preferred configuration, it can be advantageous if the evaluation device furthermore is configured to be able to determine an external pressure on the tubular construct from the measurement values from the multiplicity of strain measuring means. In particular, this can be effectuated by incorporating the measurement values from the strain measuring means in the optical waveguide of the outer layer, which also additionally capture the external pressure in this configuration, taking into account the measurement values from the strain measuring means in the optical waveguide of the inner layer, which is not influenced by the external pressure, e.g. by forming a suitable difference, which can be undertaken in the evaluation device. As an alternative, provision to this end can be made of two optical waveguides which extend within the same layer. To this end, the two optical waveguides can be redundant for determining the form such that, in the case of an initially exclusive consideration, in which the deformations would emerge from curvatures of the structure, inconsistent results can be obtained, but these can be resolved by an additional consideration of the external pressure on the construct.

In this configuration, the present apparatus can also serve as a tactile skin. The term "tactile skin" is understood to mean a technical device which has surface sensitivity which—analogously to the human or animal skin—facilitates a capture of the pressure, of vibrations and/or of the temperature. In this configuration, the present apparatus can be used to act, preferably simultaneously, as a deformation sensor and/or as a surface sensor. However, a separate use for both functional regions likewise may occur, for example by virtue of the outer layer serving to largely exclude, to the greatest possible extent, the influence of the external pressure on the determination of the deformation.

In a further aspect, the present invention comprises a method for determining the deformation of a three-dimensional, flexible structure in form of a tubular construct. Here, measurement values are captured at a multiplicity of strain measuring means and transmitted to at least one evaluation device. As described above, the strain measuring means are situated in at least one optical waveguide that has been introduced in form of a helical winding into the tubular construct. By means of the evaluation device, the deformation of the tubular construct, in particular in relation to an axis, preferably the central axis, a surface and/or a volume of the construct is determined from the captured measurement values.

In a particularly preferred configuration, the present method in this case comprises the following steps, which are preferably carried out in the specified sequence, starting with step a) and ending with step d), wherein one or more, in particular successive steps, may also be carried out at least partly simultaneously:

a) assigning the measurement values to points on a surface or a volume;
b) interpolating measurement information between points on the surface or in the volume;
c) determining deformation gradients from the measurement information, as a result of which deformation information is obtained for the surface or the volume of the tubular construct;
d) relating the deformation information to the axis, the surface and/or the volume of the tubular construct.

According to step a), the measurement values which were captured at a multiplicity of strain measuring means in the at least one optical waveguide of the construct are assigned to points on a surface or in a volume, wherein each point is set by the respective location at which its associated strain measuring means is situated. In contrast to the methods known from the prior art, the measurement values for the strain captured here are not used to ascertain one or more curvatures of the cross-sectional plane in which the considered strain measuring means are situated, but the captured measurement values for the strain are directly related to the aforementioned points. The measurement values for the strain, which in each case denote a relative change in length at the location at which the associated strain measuring means is situated, therefore also can be interpreted as a first directional derivative of the form of the construct. The discrete measurement information obtained in this way according to step a) consequently corresponds to a local deformation of the form of the construct of the aforementioned points.

In order, in particular, also to obtain measurement information between the points specified in step a), there is, according to step b), an interpolation of the measurement information between the points on the surface or in the volume. In a preferred configuration, the discrete local strain values can be interpolated over the entire surface or over the entire volume, in particular by using splines, in such a way that a dense network of measurement information for the strain can be obtained. By a selection of a degree, the selection of a base function and/or by an assignment of values to parameters, the splines can be adapted individually to the deformation properties of the material, which may be had by the carrier body.

According to step c), deformation gradients also can be determined at the locations between the points on the surface or in the volume using the dense network of measurement information for the strain from step b). The term "deformation gradient" is understood here to mean a spatial derivative of the deformation in relation to any direction. As a result of this, it is possible to ascertain deformation information for the surface (jacket form) or the volume of the construct. Here, the term "deformation information" is understood to mean values in relation to the deformation of the construct which are present locally as deformation gradients.

Now, relating the deformation information determined for the surface or the volume of the construct to a form profile, which may relate to the axis, in particular the central axis, a surface and/or a volume of the tubular construct, only is effectuated within the scope of step d). Here, the terms "reference" or "relating" are understood to mean a construction of a relation between values of the deformation information determined for the surface or for the volume of the tubular construct with locations along an axis, a surface or a volume in the tubular construct, wherein the relation can provide values for the deformation of the tubular construct in relation to the selected axis or surface or to the selected volume.

To this end, the form profile can be parameterized, preferably according to the arc length of the central axis for the case of a reference to the central axis, taking into account the known geometry of the tubular construct. In this way, it is ultimately possible to determine the deformation of the tubular construct, preferably from the form profile of the central axis of the construct, in particular by virtue of the form profile in relation to the central axis being related to a form profile that has been predetermined in relation to the central axis, for example by forming a difference between corresponding points on the surface or in the volume of the construct from the respective form profiles. A reference to a different axis than the central axis is conceivable. Alternatively, or additionally, it is possible to establish a relationship between the deformation and a surface of the construct, which may be advantageous, in particular for a case of a spatial change, caused by an external application of force that is directed on the construct, at at least one point on the surface of the construct, for example in form of an impression or bulge. Alternatively, or additionally, it is possible to establish a relationship between the deformation and a volume of the construct, preferably for the case of a spatial change of a material parameter, for example a density or a temperature, within the carrier body.

In a special configuration, it is possible, as described above, for the tubular construct to have a cavity or a plurality of cavities in relation to the axis of the construct, wherein the plurality of cavities can be arranged separately from one another and/or connected to one another by means of channels. In this case, the evaluation device can additionally determine the deformation of the hollow, tubular construct on the inner side of the hollow, tubular construct.

In a further configuration, it is possible, as described above, for the tubular construct to have at least two mutually separated layers. In this configuration, in each of the at least two layers at least one of the optical waveguides can extend. As a result, in strain measuring means, measurement values can be recorded additionally in an optical waveguide extending in an outer layer on an outer side of the tubular construct and can be transmitted to the evaluation device. The evaluation device can determine, in particular, an external pressure on the tubular construct from these additional measurement values.

In respect of further details in relation to the present method, reference is made to the description of the apparatus according to the invention.

ADVANTAGES OF THE INVENTION

The present invention has a number of advantages over the apparatuses and methods, known from the prior art, for determining a deformation of a three-dimensional, flexible structure in form of a tubular construct. A virtually freely selectable guidance of the one or more optical waveguides, into which the strain measuring means have been introduced, is facilitated. In this way, the present apparatus can be produced in a substantially simpler manner. Firstly, the requirements for positional accuracy are lower since a common sectional plane for a plurality of strain measuring means is no longer required. Additionally, positional inaccuracies still can be eliminated later by virtue of ascertaining the positions of the strain measuring means after the production of the sensor. Likewise, the evaluation of the measurement values can be adapted to the ascertained positions of the strain measuring means and to possible changes in position that occurred due to material wear. Moreover, it is also sufficient to use optical waveguides with mutually separated strain measuring means, e.g. in form of separated FBG gratings, and nevertheless obtain good results; an attachment of strain measuring means that is as continuous as possible within the length of an optical waveguide is not required. On the one hand, the number of optical waveguides in the apparatus can be reduced, allowing outlay and costs to be reduced. The helical type of guidance of the optical waveguides leads to a lower load on the individual optical waveguides, as a result of which the risk of a broken fiber can be reduced and the flexibility of the optical waveguides can be increased. On account of a small measurement deflection, the measurement range can easily be observed, as a result of which there is less overlap of different reflected wavelengths that occur during multiplexing and, which, on the other hand, facilitates an increased number of strain measuring means on a single optical waveguide.

The configuration of the present apparatus permits, in particular, a provision of a hollow, tubular construct, as a result of which a deformation sensor that can be put over an object to be measured emerges. Preferably, the apparatus moreover also can simultaneously be used as a tactile skin.

As a consequence, the present sensor can also measure surfaces as two-dimensional objects in addition to three-dimensional solid objects.

Advantages can also be obtained from a numerical point of view by way of the present determination of the deformation on the basis of the ascertained measurement values for the strain instead of on the basis of ascertained curvatures. As a result, it is possible to dispense with, in particular, integration, as a result of which, firstly, computational errors on account of rounding can be avoided and, secondly, the method overall can be accelerated and, in particular, can also be carried out in real time.

In addition to applications, particularly in the field of robotics, for example in integrated flexible joints, and in minimally invasive surgery as the sensor and for tracking flexible instruments such as endoscopes, the use in undersea cables and in the games and entertainment industry is also conceivable.

BRIEF DESCRIPTION OF THE FIGURES

Further details and features of the present invention emerge from the following description of a preferred exemplary embodiment, in particular in conjunction with the dependent claims. Here, the respective features can be implemented on their own or together in combination with one another. The invention is not restricted to the exemplary embodiments.

The exemplary embodiments are illustrated schematically in the following figures. Here, the same reference signs in the figures denote the same or functionally equivalent elements or elements that correspond to one another in terms of their functions.

In detail.

DESCRIPTION OF THE EXEMPLARY EMBODIMENTS

Figure 1:
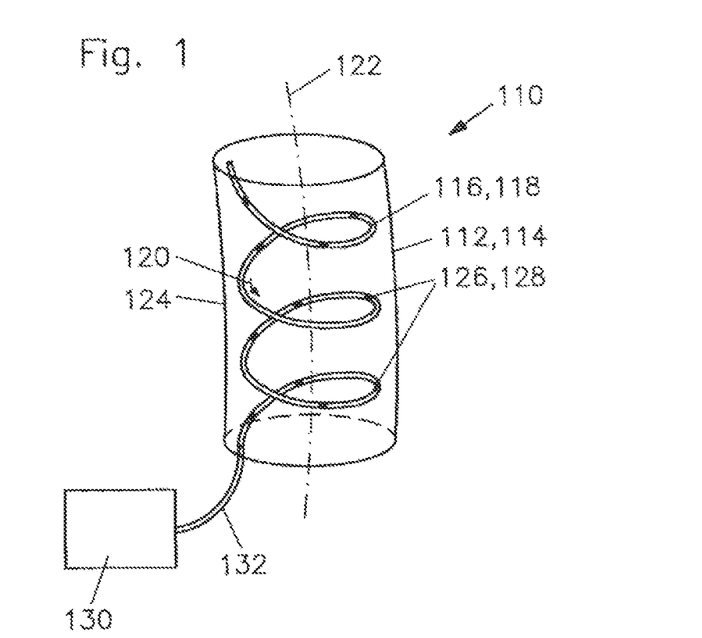
FIG. 1 shows a schematic, perspective illustration of a first exemplary embodiment of an apparatus for determining a deformation of a three-dimensional, flexible structure which comprises a solid, tubular construct.

In a perspective illustration, FIG. 1 schematically shows a first exemplary embodiment of an apparatus 110 for determining a deformation of a three-dimensional, flexible structure. In the presented first exemplary embodiment, the apparatus 110 comprises a solid, tubular construct 112 having a flexible carrier body 114 which has a plastic, preferably polyethylene (PE), as a carrier material. However, other carrier materials for the flexible carrier body 114 are conceivable.

In the present exemplary embodiment, a single optical waveguide 116 has been introduced into the tubular construct 112, said optical waveguide extending in form of a helical winding 118 within the tubular construct 112. Alternatively, two or more optical waveguides 116 also may be introduced into the tubular construct 112. Here, the helical winding 118 describes a spatial course 120 of the optical waveguide 116 in form of a screw-shaped winding along the central axis 122 in the flexible carrier body 114. Here, the central axis 122 of the tubular construct 112 is understood to mean an imaginary line which extends in such a way through the tubular construct 112 that points on the central axis 122 in each case have the greatest possible distance from the points on the outer surface 124 of the tubular construct 112. A high load on the optical waveguide 116 can be largely avoided by the use of the helical winding 118. In the present exemplary embodiment, the optical waveguide 116 has a constant pitch for the helical winding 118 along its course 120. Alternatively, the pitch of the helical winding 118 of the optical waveguide 116 may vary, either all over or else in selected sections of the tubular construct 112. Additionally, the optical waveguide 116 may have a return guidance within the carrier body 114 (not illustrated).

The optical waveguide 116 preferably is a glass fiber; however, other, preferably transparent materials are possible. The optical waveguide 116 serves as a fiber optic sensor and therefore has a multiplicity of strain measuring means 126 which, in the present case, are configured as fiber Bragg gratings (FBG) 128 and from which measurement values can be obtained, in each case by means of a use of multiplexing. The multiplicity of strain measuring means 126 are distributed at approximately equal distances along the course 120 of the optical waveguide 116 over the optical waveguide 116 in the present exemplary embodiment; however, other, even freely selectable distributions along the profile 120 of the optical waveguide 116 are possible, in particular distributions in which the strain measuring means 126 are attached to spots within the optical waveguide 116 at which particularly strong bending of the tubular construct 112 is expected.

The apparatus further has an evaluation device 130 which is configured to determine the deformation of the tubular construct 112 in relation to the central axis 122 of the tubular construct 112 from the measurement values which are provided by the multiplicity of strain measuring means 126. To this end, the evaluation device 130, which is separated from the tubular construct 112, has a connection 132, which is configured as a wired interface in the present case but which may also be configured as a wireless interface, to the optical waveguide 116. Here, in particular, the connection 132 allows transmission of the measurement values from the multiplicity of strain measuring means 126 to the evaluation device 130. Furthermore, in this exemplary embodiment, the evaluation device 130 is configured to be able to carry out one or more computer programs which carry out the steps of the method, described here, for determining the deformation of the tubular construct 112. To this end, suitable algorithms are implemented, said algorithms allowing the determination of the deformation of the tubular construct 112 in relation to an axis, preferably the central axis 122, to a surface and/or to a volume of the tubular construct 112 using the measurement values from the multiplicity of strain measuring means 126.

Figure 2:
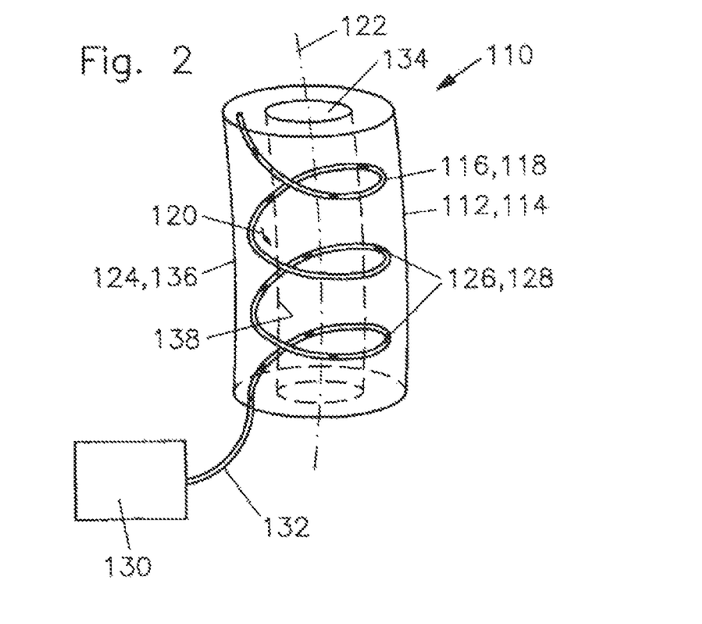
FIG. 2 shows a schematic, perspective illustration of a second exemplary embodiment of the apparatus for determining the deformation of a three-dimensional, flexible structure which comprises a hollow, tubular construct.

In a perspective illustration, FIG. 2 schematically shows a second exemplary embodiment for the apparatus 110 for determining a deformation of a three-dimensional, flexible structure. In the second exemplary embodiment, a cavity 134, which can be filled wholly or partly with a fluid or with an object, has been introduced into the flexible carrier body 114 over the entire length of the tubular construct 112 in relation to the central axis 122. As a result, the hollow, tubular construct 112 also has an inner side 138, which is set by the surface of the carrier body 114 that is formed in the cavity 134 in the interior of the carrier body 114, in addition to an outer side 136 on the outer surface 124 of the carrier body 114.

In this configuration, the evaluation device 130 can be configured to determine both the deformation on the outer side 136 of the tubular construct 112 and the deformation on the inner side 138 of the hollow, tubular construct 112, in each case preferably in relation to the central axis 122 which, in this configuration, extends completely within the cavity 134. In this case, too, the orientation of the central axis 122 of the tubular construct 112 is determined from the outer surface 124 of the tubular construct 112 only; the form of the inner side 138 is not considered here.

In this configuration, the hollow, tubular construct 112 can receive, wholly or partly, an object which can be introduced into the cavity 134 of the hollow, tubular construct 112. Here, the preferably tubular object can abut at least in part on the inner side 138 of the hollow, tubular construct 112. To the extent that, in this case, the object is likewise present in form of a flexible body, the correspondingly equipped evaluation device 130 can determine the deformation of the flexible object introduced into the hollow, tubular construct 112 from the measurement values from the multiplicity of strain measuring means 126 in the optical waveguide 116. Thus, the hollow, tubular construct 112 simultaneously can ascertain the deformation of the object abutting on the inner side 138 of the hollow, tubular construct 112 by way of determining the deformation of the inner side 138 of the hollow, tubular construct 112.

For further details in respect of the second exemplary embodiment illustrated in FIG. 2, reference is made to the exemplary embodiment shown in FIG. 1.

Figures 3, 4:
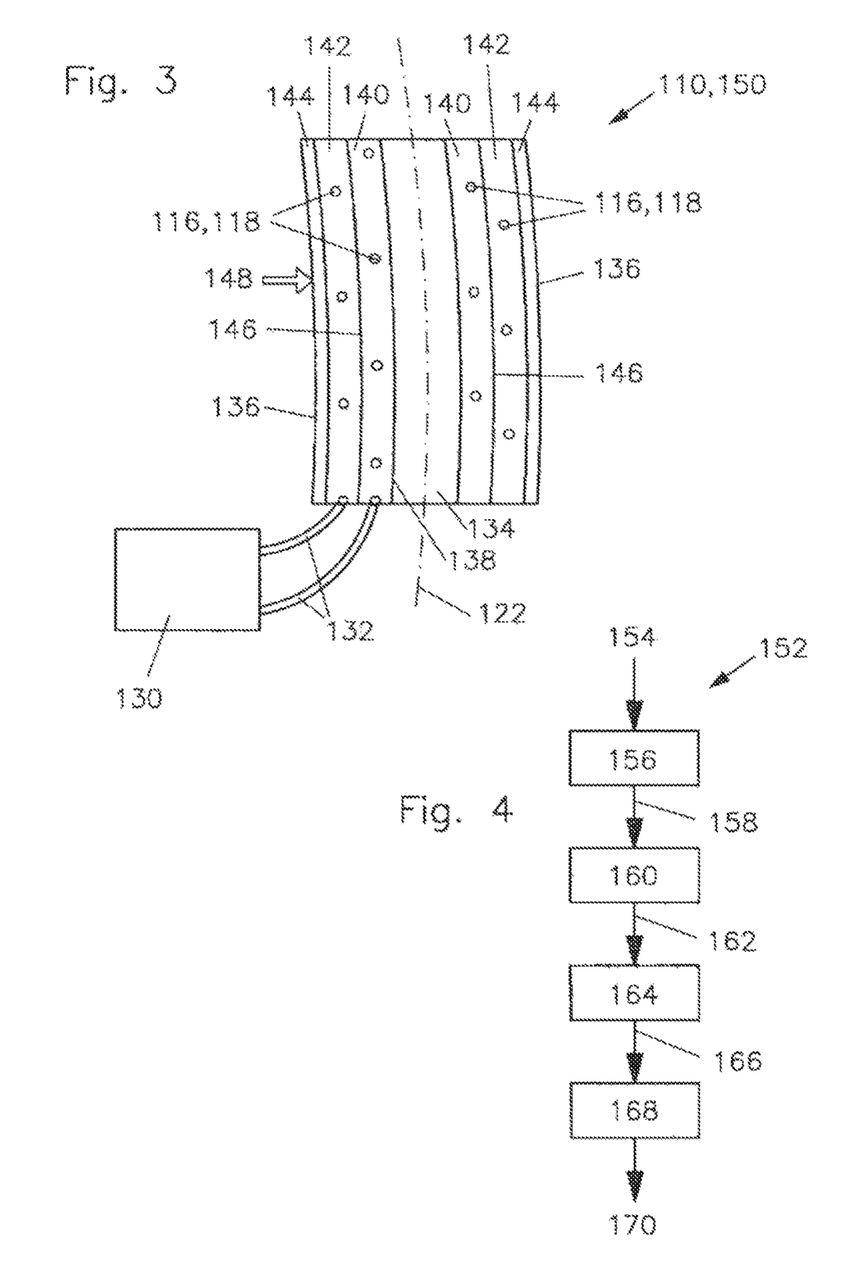
FIG. 3 shows a schematic illustration of a cross section of a third exemplary embodiment of the apparatus for determining the deformation of a three-dimensional, flexible structure which comprises a hollow, tubular construct and has two mutually separated layers.
FIG. 4 shows a schematic illustration of an exemplary embodiment for a method for determining the deformation of a three-dimensional, flexible structure.

FIG. 3 schematically shows, in form of a cross section through the hollow, tubular construct 112, the illustration of a third exemplary embodiment of the apparatus 110 for determining the deformation of a three-dimensional, flexible structure. In this exemplary embodiment, the carrier body 114 has two mutually separated layers 140, 142, which are referred to as inner layer 140 and outer layer 142. The two mutually separated layers 140, 142, which respectively extend in form of a cylindrical ring along the central axis 122 of the hollow, tubular construct 112 in this exemplary embodiment, preferably can have the same carrier material or different carrier materials. While the inner layer 140 adjoins the inner side 138 of the cavity 134, the outer layer 142 is provided with a protective layer 144 which represents the outer side 136 of the tubular construct 112. Depending on the selected embodiment, it is also possible to dispense with an embodiment of the protective layer 144 such that the outer layer 142 forms the outer side 136 of the tubular construct 112 (not illustrated). One of the optical waveguides 116, in each case in form of a helical winding 118, has been introduced into each of the two mutually separated layers 140, 142. Here each of the two optical waveguides 116 has a plurality of strain measuring means 126 in form of the fiber Bragg gratings (FBG) 128 (not illustrated).

Here, in the present exemplary embodiment, the outer layer 142 is borne in a displaceable manner in relation to the inner layer 140. To this end, the inner layer 140 is decoupled from the outer layer 142 by a film 146 made of lubricant that has been introduced between the two layers 140, 142. As a result, it is possible to be able to avoid a transfer of a torsion from the outer layer 142 to the inner layer 140, as a result of which a torsion-free measurement of the deformation of the tubular construct 112 is facilitated, in particular in relation to the central axis 122. In this embodiment, it is advantageous if the evaluation device 130 furthermore is configured to be able to determine the external pressure 148 on the tubular construct 112 from the measurement values from the multiplicity of strain measuring means 126. Here, this is effectuated by recording the measurement values from the strain measuring means 126 in the optical waveguide 116 of the outer layer 142, which additionally also capture the external pressure 148 in this configuration, while taking into account the measurement values from the strain measuring means 126 in the optical waveguide 116 of the inner layer 140, on which the external pressure 148 has no influence.

To this end, a suitable difference is formed in the evaluation device 130 between the measurement values from the strain measuring means 126 in the optical waveguide 116 of the outer layer 142 and the measurement values from the strain measuring means 126 in the optical waveguide 116 of the inner layer 140.

Particularly in the exemplary embodiment present in FIG. 3, the present apparatus 110 is suitable as a tactile skin 150 and, as a result, permits a capture both of the external pressure 148 and of vibrations and/or the temperature, which may act on the outer side 136 of the tubular construct 112. Hence, the apparatus 110 in this embodiment may act simultaneously as a deformation sensor and/or as a surface sensor. Alternatively, the outer layer 142 can serve to exclude to the largest possible extent the influence of the external pressure 148 on the determination of the deformation of the tubular construct 112.

For further details in respect of the third exemplary embodiment illustrated in FIG. 3, reference is made to the exemplary embodiments shown in FIGS. 1 and 2.

FIG. 4 schematically shows an exemplary embodiment for a method 152 for determining the deformation of a three-dimensional, flexible structure. In this exemplary embodiment, the measurement values 154 provided from the multiplicity of the strain measuring means 126 are subject, according to step a), to an assignment 156 to points on a surface or in a volume of the tubular construct 112. As a result of this, measurement information is obtained at discrete locations 158, said measurement information corresponding to a local deformation of the form of the tubular construct 112 at the points on the surface or in the volume of the tubular construct 112. Following this, there is, according to step b), an interpolation 160 of measurement information 162 between the points on the surface or in the volume of the tubular construct 112. From the measurement information 162 obtained thus, there is, according to step c), a determination 164 of deformation gradients, from which deformation information 166 for the surface or the volume of the tubular construct 112 is obtained. According to step d), the deformation information 166 for the surface or the volume of the tubular construct 112 is related 168 to an axis, preferably to the central axis 122, to a surface and/or to a volume of the tubular construct 112.

By taking into account the known geometry of the tubular construct 112, it is thus possible to parameterize the form profile, preferably according to the arc length of the central axis 122. In this way, the deformation 170 of the tubular construct 112 is determined from the form profile in relation to the central axis 122, in particular by virtue of the form profile in relation to the central axis 122 being related to a predetermined form profile in relation to the central axis 122. Alternatively, or additionally, a parameterization can be undertaken according to a different axis than the central axis 122, a part of the surface and/or a part of the volume of the tubular construct 112.

To the extent that the tubular construct, as illustrated in the exemplary embodiment according to FIG. 2, has a cavity 134, which cavity is preferably arranged in relation to the central axis 122 of the hollow, tubular construct 112, the evaluation device additionally can determine the deformation of the hollow, tubular construct 112 on the inner side 138 of the hollow, tubular construct 112 and, optionally, determine the deformation of an object abutting thereon, said object having being introduced into the cavity 134.

If, as illustrated in the exemplary embodiment according to FIG. 3, the tubular construct 112 has two mutually separated layers 140, 142, measurement values can be recorded in the strain measuring means 126 in an optical waveguide 116 that extends in the layer 142 on the outer side 136 of the tubular construct 112 and said measurement values can be transmitted to the evaluation device 130, the latter being able to additionally determine the external pressure 148 on the tubular construct 112 herefrom.

LIST OF REFERENCE SIGNS

110 Apparatus
112 Tubular construct
114 Carrier body
116 Optical waveguide
118 Helical winding
120 Course
122 Central axis
124 Outer surface
126 Strain measuring means
128 Fiber Bragg grating (FBG)
130 Evaluation device
132 Connection
134 Cavity
136 Outer side
138 Inner side
140 Inner layer
142 Outer layer
144 Protective layer
146 Film made of lubricant
148 External pressure
150 Tactile skin
152 Method
154 Measurement values
156 Assignment to points
158 Measurement information at discrete locations
160 Interpolation
162 Measurement information
164 Determination of deformation gradients
166 Deformation information
168 Relating
170 Deformation

The invention claimed is:

1. An apparatus for determining a deformation of a three-dimensional, flexible structure in form of a tubular construct, wherein the apparatus comprises the tubular construct, wherein at least one optical waveguide is introduced into the tubular construct, the optical waveguide extending in form of a helical winding within the tubular construct, wherein the optical waveguide has a multiplicity of strain measuring means, wherein the apparatus further comprises at least one evaluation device, wherein the evaluation device is configured to determine the deformation of the tubular construct from measurement values from the multiplicity of strain measuring means; and wherein the evaluation device is further configured to relate deformation information ascertained from the measurement values of the deformation of the tubular construct to at least one of an axis, a surface, and a volume of the tubular construct, wherein the measurement values are available locally as deformation gradients.

2. The apparatus of claim 1, wherein the tubular construct is designed in a hollow fashion in relation to a central axis of the construct and wherein the at least one evaluation device is further configured to additionally determine a deformation on an inner side of the hollow tubular construct.

3. The apparatus of claim 1, wherein the evaluation device is further configured to assign the measurement values to points on one of a surface or a volume of the tubular construct.

4. The apparatus of claim 1, wherein the hollow tubular construct is configured to be pulled over an object in such a way that the object abuts on an inner side of the hollow tubular construct at least in part, wherein the evaluation device is further configured to additionally determine a deformation of the object introduced into the hollow tubular construct from the measurement values from the multiplicity of strain measuring means.

5. The apparatus of claim 1, wherein the tubular construct has at least two mutually separated layers, wherein the at least one optical waveguide extends in each of the at least two mutually separated layers, wherein an inner layer is arranged on an inner side in relation to the central axis of the tubular construct and an outer layer is arranged on an outer side of the hollow tubular construct.

6. The apparatus of claim 5, wherein the inner layer and the outer layer are borne in a manner displaceable with respect to one another.

7. The apparatus of claim 1, wherein the evaluation device is further configured to additionally determine an external pressure on the tubular construct from the measurement values from the multiplicity of strain measuring means.

8. The apparatus of claim 1, wherein at least two optical waveguides are provided, wherein two of the optical waveguides have an opposing helical winding in relation to one another.

9. A method for determining a deformation of a three-dimensional, flexible structure in form of a tubular construct, wherein measurement values are captured at a multiplicity of strain measuring means, which are comprised by at least one optical waveguide that has been introduced in form of a helical winding into the tubular construct, and transmitted to at least one evaluation device, wherein the at least one evaluation device determines a deformation of the tubular construct from the measurement values;

wherein the deformation of the tubular construct is determined from the measurement values according to the following steps:
a) assigning the measurement values to points on a surface or a volume of the tubular construct;
b) interpolating measurement information between points on the surface or in the volume of the tubular construct;
c) determining deformation gradients from the measurement information, as a result of which deformation information is obtained for the surface or the volume of the tubular construct; and
d) relating the deformation information to at least one of an axis, a surface, and a volume of the tubular construct.

10. The method of claim 9, wherein the tubular construct is designed in a hollow fashion in relation to an axis of the construct and the evaluation device additionally determines a deformation of the hollow tubular construct on the inner side of the hollow tubular construct.

11. The method of claim 9, wherein the tubular construct has at least two mutually separated layers, wherein the at least one optical waveguide extends in each of the at least two mutually separated layers, wherein the measurement values are recorded in strain measuring means in an optical waveguide that extends in an outer layer on an outer side of the tubular construct and transmitted to the evaluation device.

12. The method of claim 9, wherein the evaluation device determines an external pressure on the tubular construct from the measurement values.

* * * * *